March 16, 1948. R. P. HANNA 2,438,007
TROLLEY CONDUCTOR DEVICE
Filed Sept. 7, 1945
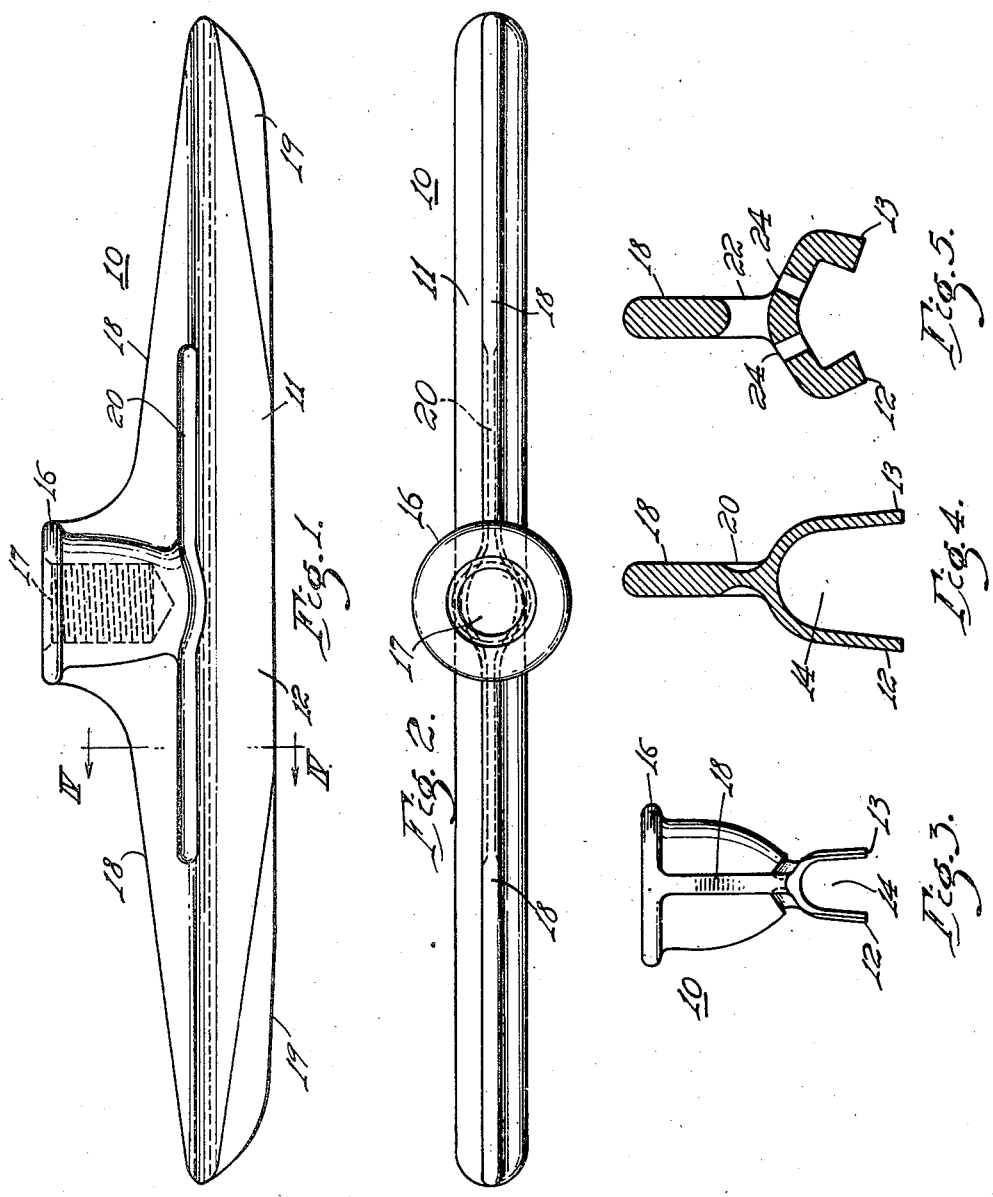
WITNESSES:
INVENTOR
Raymond P. Hanna.
BY
ATTORNEY Patented Mar. 16, 1948

2,438,007

UNITED STATES PATENT OFFICE 2,438,007

TROLLEY CONDUCTOR DEVICE

Raymond P. Hanna, Wilkinsburg, Pa., assignor to Westinghouse Electric Corporation, East Pittsburgh, Pa., a corporation of Pennsylvania Application September 7, 1945, Serial No. 614,944

7 Claims. (Cl. 191—43)

My invention relates generally to trolley conductor devices, and it has reference in particular to ears for supporting trolley conductors.

Generally stated, it is an object of my invention to provide a trolley ear that is simple and inexpensive to manufacture and is easy to install.

More specifically, it is an object of my invention to provide for making a trolley ear by die-casting it with relatively thin depending lips which may be readily peened about a trolley conductor to secure it, without first requiring any machining of the lips.

Another object of my invention is to provide for producing a die-cast trolley ear which has relatively thin lip portions which may be readily formed about a trolley conductor, whether round or grooved.

Yet another object of my invention is to provide for decreasing the resistance to bending of the lips of a unitary die-cast trolley ear.

Still another object of my invention is to provide for reducing the thickness of the lips and/or the web of a unitary trolley ear adjacent their junction, so as to render the lips more readily bendable about a trolley conductor.

Other objects will, in part, be obvious, and will, in part, be described hereinafter.

In practicing my invention, a unitary trolley ear having a support boss joined to a channel member with depending lips by an integral web is die-cast to its finished dimensions in a permanent metal mold. An alloy of copper and iron is used to provide the necessary fluidity to form the relatively thin lip sections without flaws and to provide the necessary hardness to resist abrasion when solidified. Peening of the lips about a trolley conductor is made possible despite the use of such a relatively hard metal, by providing an elongated recess or opening in the web adjacent its junction with the channel member, so as to provide a greater distance throughout which the lips may bend.

The recent trend towards the use of carbon insert current collectors makes the use of thin side wall or lip ears on trolley bus systems become more necessary. With carbon insert collectors it is essential that the width of the wire supporting structure be kept to a minimum in order to secure sufficient operating mileage from carbon insert shoes. Where sand cast ears are used they must be machined to produce the necessary thin sections, as well as to secure a good fit on the conductor. Since trolley ears are present in far greater numbers than other overhead devices, they are a major problem in carbon insert operation. Die-cast ears of the type embodied in my invention may be readily used with either rigid harp or swivel current collectors, and are quite superior with carbon insert shoes. They thus lend themselves readily to the conversion of lines from street car to trolley bus, or where both are to operate.

For a more complete understanding of the nature and scope of my invention, reference may be made to the accompanying drawing, in which:

Figure 1 is a side elevational view of a trolley ear for round wire embodying the invention in one of its forms;

Fig. 2 is a plan view of the trolley ear shown in Fig. 1;

Fig. 3 is an end elevational view of the trolley ear shown in Figs. 1 and 2;

Fig. 4 is an enlarged sectional view taken along the line IV—IV of Fig. 1; and

Fig. 5 is an enlarged sectional view of a trolley ear illustrating a different embodiment of the invention as applied to a clinch type ear for grooved or figure-eight conductor.

Referring to Figs. 1 through 4, the reference numeral 10 may denote generally a trolley ear comprising a generally channel shaped body portion 11 having depending lips 12 and 13 disposed to be peened about a trolley conductor positioned in the channel 14 between the lips. A support boss 16 may be provided on the upper side of the channel portion 11 intermediate the ends thereof having a threaded opening 17 therein for attachment to an insulating support or the like. The support boss 16 and the channel portion 11 may be provided with reinforcing means such as the longitudinal web portions 18 which extend along the upper side of the channel portion and connect with the support boss.

In order to provide a trolley ear which is simple and inexpensive to manufacture and is easy to install and durable in operation, the channel portion, support boss and web may be formed integral. For the purpose of producing a trolley ear which has relatively thin lip sections so as to minimize shoe wear, and yet require a minimum of machining, the channel portion, support boss and web may be formed in a die-casting operation by means of a permanent metal mold. According to this method of manufacture, the lips 12 and 13 may be formed initially to their final dimensions and provided with end portions 19 at each end which are tapered, being of gradually decreasing depth and thickness towards the ends of the channel portion.

In order to provide for die-casting the relatively thin tapered lip sections without flaws, it is necessary to use a metal which is relatively fluid when molten. At the same time, the trolley ear must have a relatively high electrical conductivity and also have a relatively high resistance to mechanical abrasion. These characteristics may be obtained by using a copper iron alloy having the following composition: Copper 85 to 89%; aluminum 7 to 9%; iron 2.5 to 4%.

The basic ingredients of this metal, outside of the iron, result in a material which is relatively easy to peen, but which is not fluid enough to flow the material uniformly throughout the thin sections of the lips. The iron provides the necessary fluidity to secure a sound casting throughout the thin lip sections, but produces a relatively hard metal having a hardness of about 80 Rockwell B, which is somewhat more difficult to peen. In order to permit readily peening the lips about a trolley conductor, the web 18 may be provided with a section of reduced thickness immediately adjacent the junction thereof with the channel portion 11. Such a section may be provided by means of an elongated recess or opening 20 on each side of the web. The provision of this reduced section permits bending of the lips to begin at a point further from the edge, thereby distributing the stresses due to bending of the lips during peening over a greater cross section, and permitting more uniform flow of the metal during bending. This minimizes the concentration of stresses, and permits peening of the lips without cracking the metal.

The present invention may be applied to ears for grooved and figure-eight conductors, as well as round ones, and instead of providing longitudinal recesses 20 in the web portion to facilitate bending of the lips, longitudinal openings 22 may be provided in the webs 18 as shown in Fig. 5, which represents a section through a clinch type ear for grooved trolley conductor, corresponding to the section IV—IV of Fig. 1. Elongated slots 24, may be provided in the channel portion itself adjacent the web, either together with the recesses 20 or openings 22, or in place of them, to reduce the area of a section adjacent the junction of the web and channel and facilitate peening the lips 12 and 13 about a trolley conductor in a manner similar to that of the recesses or openings 20 of Figs. 1 through 4.

From the above description and the accompanying drawing, it will be apparent that I have provided, in a simple and effective manner, for improving the peening characteristics of a die-cast unitary trolley ear. By providing a trolley ear, wherein the lips, support boss and web are cast integral in a single operation, the highest mechanical strength is assured. By providing for die-casting the ear in a permanent metal mold, the relatively thin lip sections may be provided together with their tapered end sections in a single operation, thus greatly reducing the cost. In addition, the channel for receiving the trolley conductor may be accurately dimensioned, so as to provide a good fit for the conductor, thus ensuring better operating characteristics of the ear in service.

Since certain changes may be made in the above-described construction and different embodiments of the invention may be made without departing from the spirit or scope thereof, it is intended that all the matter contained in the above description and shown in the accompanying drawing shall be considered as illustrative and not in a limiting sense.

I claim as my invention:

1. A trolley conductor support comprising, a unitary die-cast body having an elongated channel portion with depending lips arranged to be peened about a trolley conductor, a support boss, and an elongated web joining the boss and the channel portion throughout the length of the channel portion, said web having an elongated recess adjacent the junction with the channel portion to facilitate bending the channel portion about a conductor.

2. In a die-cast trolley conductor ear, a support boss, a channel portion with dependent lips, said channel portion being relatively thin and of substantially uniform thickness to permit uniformly bending the lips about a trolley wire, and an elongated web portion of generally greater thickness than the channel portion to prevent longitudinal bending of the channel portion, said web portion being integral with the support boss and the channel portion extending substantially the length of the channel portion, one of said portions having a reduced section therein adjacent their junction for increasing the bendability of the lips.

3. A trolley conductor ear comprising, a unitary die-cast body of a copper-iron alloy of a composition with 85% to 89% copper, aluminum 7% to 9% and iron 2.5% to 4% and having a channel portion with thin-walled dependent lips, a support, and an elongated web integral with the channel portion and the support and having elongated recesses on opposite sides adjacent the junction of the web with the channel portion to reduce the thickness of the web at the junction.

4. A unitary die-cast trolley conductor support comprising, a die-cast channel portion having dependent lips of decreasing height and thickness from points intermediate the ends towards the ends, a support boss cast integral with the channel portion, and an elongated web cast integral with the support boss and the channel portion extending substantially the length of the upper side thereof, said web having a reduced section at the junction with the channel portion extending between the support boss and the points at which the lips commence to decrease in depth.

5. A trolley conductor support comprising, a unitary body die-cast from a copper-iron alloy having a hardness of 80 Rockwell B, said body comprising a channel portion with depending lips and a support member thereon and an elongated web integral with the channel portion and support member throughout a substantial portion of the length of the channel portion, said web having relatively narrow elongated grooves on each side immediately adjacent the channel portion to facilitate peening of the lips about a conductor.

6. In a die-cast trolley conductor ear, an elongated channel portion having depending lips for securing a conductor, a support intermediate the ends of the channel portion, and an elongated web die-cast integral with the channel portion and support, throughout a greater portion of the length of the channel portion, said channel portion and web being die cast of a copper-iron alloy to obtain uniform thickness of the lips, said channel portion having a reduced longitudinal section on each side of its junction with the web to neutralize the resistance to bending produced by the iron in the alloy.

7. A trolley conductor ear comprising, a support portion die-cast integrally with an elongated channel portion having depending lips, and a web die-cast integral with the channel portion and support portion, said web being generally of a uniform thickness and having relatively narrow elongated openings on each side of the support portion immediately adjacent the junction of the web with the channel portion to reduce the area of a longitudinal section adjacent the junction and increase the bending radius of the lips.

RAYMOND P. HANNA.

REFERENCES CITED

The following references are of record in the file of this patent:

UNITED STATES PATENTS

| Number | Name | Date |
|---|---|---|
| 499,943 | Spillman | June 20, 1893 |
| 719,112 | Hill | Jan. 27, 1903 |
| 958,906 | Callender | May 24, 1910 |
| 1,463,420 | Hale | July 31, 1923 |
| 1,521,200 | Matthes | Dec. 30, 1924 |
| 1,728,820 | Bower | Sept. 17, 1929 |
| 2,327,699 | Dunn | Aug. 24, 1943 |